(12) United States Patent
Manela et al.

(10) Patent No.: US 8,203,479 B2
(45) Date of Patent: Jun. 19, 2012

(54) ELECTRONIC COUNTER MEASURE SYSTEM

(75) Inventors: Reuel Manela, Kiriat Ono (IL); Arye Raybee, Rosh-Hayon (IL); Eran Kanter, Elkana (IL); David Blank, Modi'in (IL)

(73) Assignee: Elbit Systems EW and Sigint—Elisra Ltd., Bene Beraq (IL)

( * ) Notice: Subject to any disclaimer, the term of this patent is extended or adjusted under 35 U.S.C. 154(b) by 0 days.

(21) Appl. No.: 13/387,171

(22) PCT Filed: Apr. 6, 2011

(86) PCT No.: PCT/IL2011/000292
§ 371 (c)(1),
(2), (4) Date: Jan. 26, 2012

(87) PCT Pub. No.: WO2011/125060
PCT Pub. Date: Oct. 13, 2011

(65) Prior Publication Data
US 2012/0119933 A1 May 17, 2012

(30) Foreign Application Priority Data

Apr. 8, 2010 (IL) .......................................... 204908
Apr. 8, 2010 (IL) .......................................... 204909

(51) Int. Cl.
*G01S 7/38* (2006.01)

(52) U.S. Cl. ............................................ 342/14; 342/57
(58) Field of Classification Search .............. 342/13–15, 342/57
See application file for complete search history.

(56) References Cited

U.S. PATENT DOCUMENTS

| 4,107,609 | A | * | 8/1978 | Gruenberg ...................... 455/16 |
| 6,791,472 | B1 | * | 9/2004 | Hoffberg ...................... 340/905 |
| 7,304,607 | B2 | * | 12/2007 | Miyamoto et al. ............. 342/370 |
| 2006/0238414 | A1 | * | 10/2006 | Miyamoto et al. ............. 342/351 |
| 2009/0322585 | A1 | * | 12/2009 | Galasso .......................... 342/14 |
| 2011/0224865 | A1 | * | 9/2011 | Gordon et al. .................. 701/32 |

OTHER PUBLICATIONS

Burris, H. R., Moore, C. I., Overfield, J., Smith, W. R., Suite, M. R., Thomas, L. M., . . . Freeman, W. (2011). Tactical network demonstration with free space lasercomm doi:10.1117/12.879476.*

* cited by examiner

*Primary Examiner* — John B Sotomayor
(74) *Attorney, Agent, or Firm* — Brown Rudnick LLP (57) ABSTRACT

A tactical electronic counter measure system comprising a first retro-directional transceiver sub system, receiving signals at a first frequency band, and first retro-directional transceiver re transmitting a signal at least substantially toward the direction from which the sources signal was received, and first retro directional transceiver sub system including a plurality of blade antennas and a controller, coupled with and first retro-directional transceiver, and controller controlling the activity of and first retro directional transceiver sub system, and controller further managing the missions of and first retro directional transceiver sub system.

20 Claims, 9 Drawing Sheets

ELECTRONIC COUNTER MEASURE SYSTEM

FIELD OF THE DISCLOSED TECHNIQUE

The disclosed technique relates to Electronic Counter Measure Systems in general, and to a dual band Electronic Counter Measure Systems, in particular.

BACKGROUND OF THE DISCLOSED TECHNIQUE

Electronic Counter Measure (ECM) systems generally operate over a large range of frequencies, for example, between the VHF frequency band and K frequency band (i.e., according to the IEEE radio bands). These systems are typically divided into a plurality of sub-systems, each operating on a corresponding frequency range and packaged separately. For example, the ALQ-99 system is housed in five different pods. Furthermore, this multiplicity of sub-systems results in substantial power consumption. One of the sub-systems in an ECM system may be a signal re-transmitting system. Retransmitting signals toward the direction from which signals are received (i.e., either the same signals or other signals) may increase the Signal-to-Noise Ration (SNR) of the retransmitted signal. Another application of retransmitting signals toward the direction from which signals are received is in ECM systems. For example, interfering with signals transmitted by a RADAR allows a vehicle (e.g., aircrafts, vessels, land vehicles) to impair the detection of that vehicle and other vehicles by the RADAR. According to one known in the art method for interfering with RADAR signals the vehicle transmits a directional interfering signal, substantially similar to the RADAR signal, toward the RADAR. Since the directional interfering signal is substantially similar to the RADAR signal the RADAR cannot distinguish between the interfering signal and the RADAR signal reflected from the vehicle. Thus, the interfering signal 'jams' the RADAR signal. Transmitting a directional signal requires either using directional antennas (e.g., horn antennas) or using a phased antenna array, where the relative position of the antennas in the array is known.

U.S. Pat. No. 7,248,203 to Gounalis, entitled "System and Method for Detecting and Jamming Emitter Signals", describes a detection system which includes one or more antenna and a processing systems that receive and process signals received by the antenna. These signals are, for example, electromagnetic signals transmitted in any one of a number of frequencies, including radar, communication, and other types of signals. The received signals are passed to the processor. The processor implements a scan strategy detecting one or more threats by observing frequency bands defined by the scan strategy. The system determines the scan strategy. The scan strategy is determined to optimize signal intercept of an selected sets of emitter or emitters parameters. The scan strategy is also determined to minimize the "dwells" for each emitter. A dwell defines the scan resources such as frequency range, scan period and revisit time. The processor determines emitter parameters according to the received signals in the determined "dwells". The processor determines a jamming signal and provides this jamming signal to a jammer transmitter which "jams" the emitter.

U.S. Pat. No. 4,467,328 to Hacker, entitled "RADAR Jammer With an Antenna Array of Pseudo-Randomly Spaced Radiating Elements", directs to a RADAR jammer which includes an antenna array with randomly spaced elements, a jammer transmitter, a power divider, and a plurality of phase shifting elements. The RADAR jammer further includes a directional finding system which includes four monopulse horn antennas, a monopulse receiver, a phase-shifter logic and phase-shifter drivers. The power divider is coupled with the jammer transmitter and with the phase shifting elements. The phase-shifter driver is coupled with the phase shifting elements and with the phase-shifter logic. The monopulse receiver is coupled with the four horn antennas and with the phase-shifter logic. The phase shifting elements are further coupled with the antenna array elements.

The monopulse receiver receives signals from the horn antennas and determines the direction of the detected threat and generates a signal representative of the threat direction. The phase-shifter has values of the spacing of the antenna array elements stored thereat (i.e., the spacing dimensions of the randomly distributed antenna elements are known) and determines a set of phase shifting signals intended to alter the phase of the power signals of the radiation elements to render a single narrow high power beam of jamming radiation directed at the detected threat. Because of the spread-out nature of the radiating elements, it is proposed that the main beam will be much narrower and require much less energy to defeat the RADAR threat in the detected direction. As a result, the remaining energy associated with the spuriously produced beam is spread out over the entire threat volume dispersed everywhere.

U.S. Pat. No. 4,472,719, to Hills, entitled "ECM Multiple-Target Retrodirective Antenna" directs to a receive and transmit linear antennas arrays each including a plurality of antenna elements. Each antenna element is mounted in a horizontal plane and connected via an equal length transmission line to a microwave. The microwave lens consists of two parallel conducting surfaces spaced less than half a wavelength apart. Each output port of the microwave lens corresponds to an individual beam pattern in azimuth. A logic processor converts the voltages from each receiver to binary voltage. The binary voltages are gated to a switching apparatus which receives ECM signals from an external source. The logic processor detects the signal and activates the switch to transmit the signal according to the desired beam.

SUMMARY OF THE PRESENT DISCLOSED TECHNIQUE

It is an object of the disclosed technique to provide a novel system for electronic counter measures.

In accordance with the disclosed technique, there is thus provided a tactical electronic counter measure system. The system includes a first retro-directional transceiver sub-system and a controller. The controller is coupled with the first retro-directional transceiver sub-system. The first retro-directional transceiver sub-system receives signals at a first frequency band. The first retro-directional transceiver sub-system re-transmits a signal, at least substantially toward the direction from which a sources signal was received. The first retro-directional transceiver sub-system includes a plurality of blade antennas. The controller controls the activity of first retro-directional transceiver sub-system. The controller further manages the missions of the first retro-directional transceiver sub-system.

In accordance with another aspect of the disclosed technique, there is thus provided a dual band tactical electronic counter measure system. The dual band tactical electronic counter measure system includes a first band transceiver sub-system and a controller. The controller is coupled with the first band transceiver sub-system. The first band transceiver sub-system includes a communication and RADAR digital transceiver and a first communication transceiver. The controller controls the activity the first band transceiver sub-system. The controller further manages the missions of the first band transceiver sub-system.

In accordance with a further aspect of the disclosed technique, there is thus provided a tactical electronic counter measure system. The tactical electronic counter measure system includes a first-band transceiving array, a second band transceiver module, a RADAR receiver, a communications receiver, a signal source generator, a switch and a controller. The first-band transceiving array includes a plurality of blade antennas and a plurality of first-band transceiver modules each coupled with a respective one of the antennas. The second band transceiver module is coupled with a respective antenna. The RADAR receiver is coupled, during a reception period, with each of the first-band transceiver modules and with the second band transceiver module. The communications receiver is coupled, during a reception period, with each of the first-band transceiver modules and with the second band transceiver module. The signal source generator is coupled, during a first transmission period with the first-band transceiver modules. The signal source generator is further coupled, during a second transmission period with the second-band transceiver module. The switch is coupled with the RADAR receiver, with the communications receiver, and with the signal source generator. The controller is coupled with the switch, with the RADAR receiver, with the communications receiver and with the signal source generator.

Each of the first-band transceiver modules receives a source signal transmitted by an emitter during a reception period. Each of the first-band transceiver modules further shifts the phase of an intermediate signal by a respective relative phase-shift and transmits the phase shifted intermediate signal via the respective antenna thereof. The second-band transceiver module receives, during the reception period, a source signal transmitted by an emitter. The second-band transceiver module further transmitting an intermediate signal via the respective antenna thereof. The RADAR receiver determines a second received RADAR signal parameters corresponding to a first and a second frequency band. The RADAR receiver further determines a respective relative phase, for each of the received signals, relative to a reference phase, thereby determining the respective relative phase of the first-band transceiver module. The RADAR receiver further provides the respective relative phase to each of the first-band transceiver modules. The communications receiver determines second received communications signal parameters corresponding to a first and a second frequency band. The communications receiver further determines a respective relative phase for each of the received signals relative to a reference phase thereby determining the respective relative phase for each of the first-band transceiver modules. The communications receiver further provides the respective relative phase to each of the first-band transceiver modules.

The signal source generator generates a first intermediate signal according to the first received signal parameters. The signal source generator generates a second intermediate signal according to the second received signal parameters. The signal source generator provides the first intermediate signal to the transceiver modules during the first transmission period. The signal source generator provides the second intermediate signal to the second-band transceiver module during the second transmission period. The controller directs the switch to couple the first-band transceiver modules and the second-band transceiver module with the RADAR receiver and with the communications receiver during a reception period. The controller further directs the switch to couple the signal source generator with the first-band transceiver modules during the first transmission period and with the second-band transceiver module during the second transmission period. The controller further controls the activity and manages the missions of the RADAR receiver, the communications receiver and the signal source generator.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a low frequencies tactical ECM system which includes a first retro-directional transceiver sub-system and a second transceiver sub-system. The low frequencies dual tactical ECM system operates, in particular, between the VHF band and the C (i.e., according to the IEEE radio bands) frequency band. The first transceiver sub-system operates in a first frequency band, in particular between the UHF band and the C frequency band. The First transceiver sub-system re-transmits a signal toward the signal source, such as a communications device or a RADAR, using a phased antenna array where the relative positions of the antennas is unknown. The source signal is received by each antenna in the antenna array and recorded. Thereafter the sub-system re-transmits the received source signal, by the same antenna array that received the signal, such that the re-transmitted signal is transmitter at least substantially toward the direction from which the sources signal was received. The first retro-directional transceiver sub-system according to the disclosed technique may alter the relative phase of the re-transmitted signal (i.e., the relative phase between each pair of antennas in the antenna array) from the negative of the relative phase of the received source signal to introduce additional effects to the re-transmitted signal (e.g., de-focusing, multi-beam). The second transmitting sub-system operates in a second frequency band, in particular between the VHF band and the UHF band. The second transmitting sub-system includes a digital transmitter.

In the system according to the disclosed technique, RADAR jamming and communication jamming are integrated into one system. Furthermore, the Effective Radiated Power (ERP) of the RADAR is lower at low frequencies. Therefore, the required ERP of the system is also lower resulting in reduced power consumption (e.g., up to three kilowatts). Furthermore, reduced power consumption results in substantially lower heat dissipation which needs to be evacuated (i.e., the system needs substantially less cooling) relative to other systems transmitting in high frequencies (e.g., in the X and $K_u$ bands. Furthermore, the transmitter in the second transceiver sub-system is a frequency selective transmitter transmitting only in the frequencies of the received signal further reducing the power consumption of the system. Additionally, the system may be implemented with solid state technology resulting in the system occupying smaller volume (i.e., relative to systems operating in the high frequency bands) and further reduction in the power consumption of the system. The reduced volume of the system according to the disclosed technique simplifies housing the system within an aerodynamic container (e.g., pod, bomb shell). This makes the system particular useful for self protection and escort jamming applications.

Figure 1:
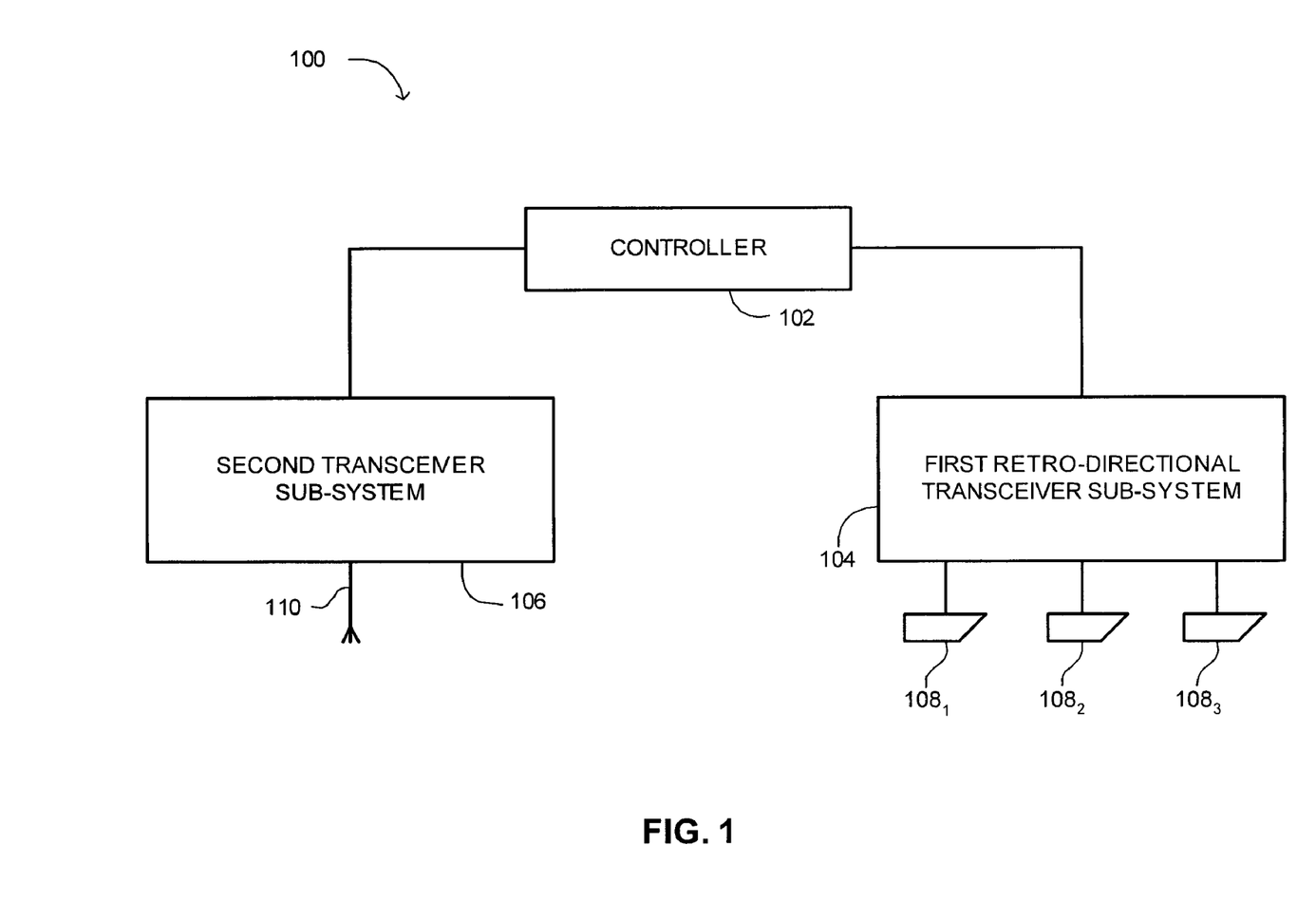
FIG. 1 is a schematic illustration of a low frequencies tactical ECM system, constructed and operative in accordance with an embodiment of the disclosed technique.

Reference is now made to FIG. 1, which is a schematic illustration of a low frequencies tactical ECM system, generally reference 100, constructed and operative in accordance with an embodiment of the disclosed technique. System 100 includes a controller 102, a first retro-directional transceiver sub-system 104 and a second transceiver sub-system 106. First retro-directional transceiver sub-system 104 operates between the UHF band and the C frequency band. First retro-directional transceiver sub-system 104 further includes an antenna array, which includes a plurality of antennas $108_1$, $108_2$ and $108_3$. Antennas $108_1$, $108_2$ and $108_3$ are embodied as 'blade antennas' (i.e., antennas that are located within a body exhibiting a blade like shape). Second transceiver sub-system 106 includes antenna 110. Antenna 110 may also be embodied as a blade antenna. Both first retro-directional transceiver sub-system 104 and second transceiver sub-system 106 are coupled with controller 102.

First retro-directional transceiver sub-system 104 receives signals at the first frequency band and re-transmits a signal at least substantially toward the direction from which the sources signal was received. First retro-directional transceiver sub-system 104 is further explained below in conjunction with FIGS. 2, 3 and 4E. Second transceiver sub-system 106 includes a communication and RADAR digital transceiver and a second communication transceiver. Second transceiver sub-system 106 is further explained in conjunction with FIG. 5. Controller 102 controls the activity of both the first retro-directional transceiver sub-system 104 and second transceiver sub-system 106. This includes resources (e.g., power) management and time sharing (e.g., when harmonic signals from one band interfere with the received signal in the other band). Controller 102 further manages the different missions of first retro-directional transceiver sub-system 104 and second transceiver sub-system 106. These missions include, for example, emitter acquisition (i.e., recognizing the transmission of an emitter and determining the characteristics thereof) and emitter maintenance (i.e., updating the characteristics of an acquired emitter). It is noted that either one or both first retro-directional transceiver sub-system 104 and second transceiver sub-system 106 interfere with both RADAR and communication devices. For example, first retro-directional transceiver sub-system 104 interferes with both RADAR and communications while second transceiver sub-system 106 interferes only with communications. Thus, system 100 interferes with both RADAR and communications (i.e., RADAR jamming and communication jamming are integrated into one system).

Figure 2:
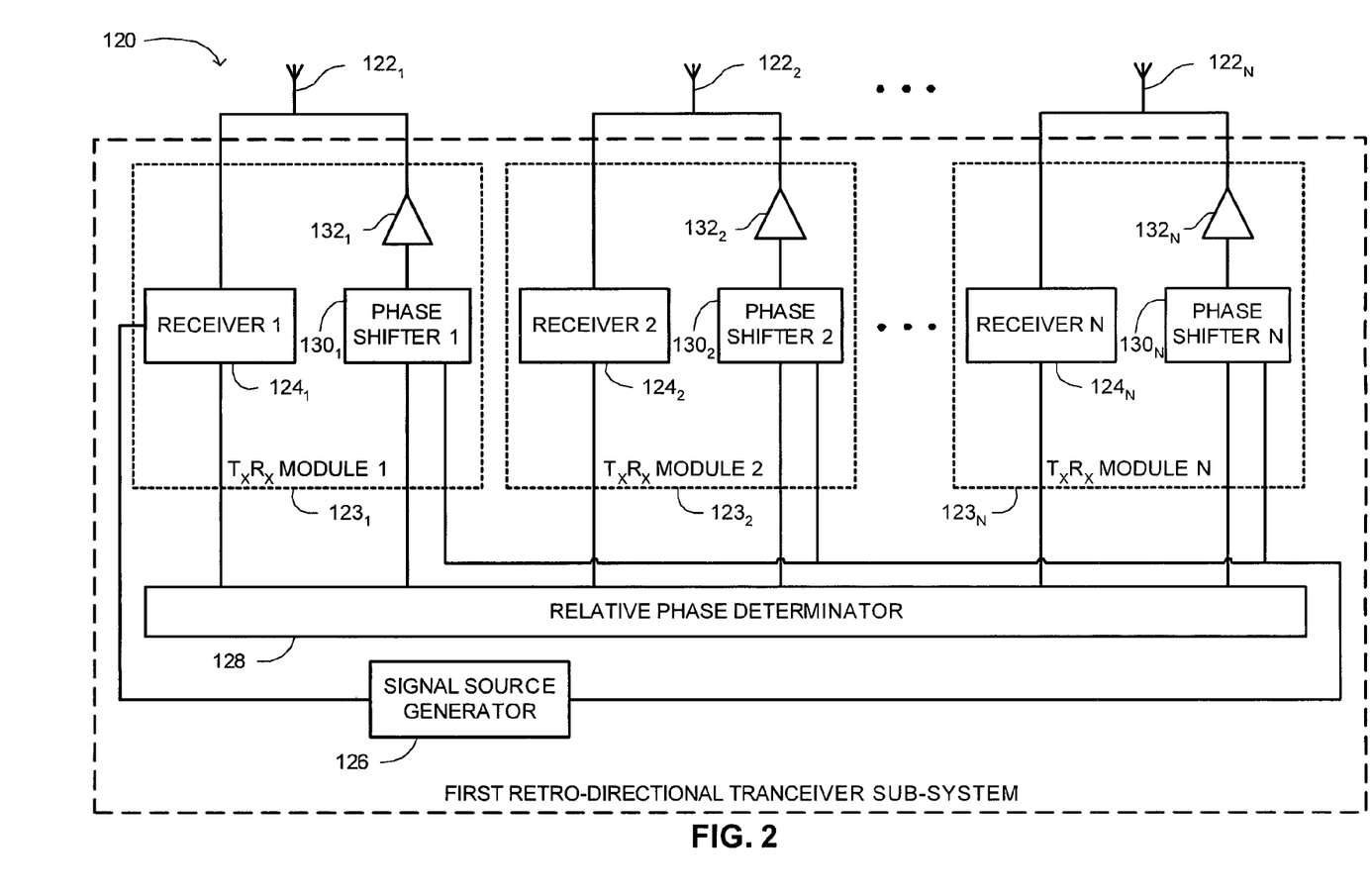
FIG. 2 is a schematic illustration of a first retro-directional transceiver sub-system, constructed and operative in accordance with another embodiment of the disclosed technique.

As mentioned above, the first retro-directional transceiver sub-system receives signals at a first frequency band and re-transmits a signal at least substantially toward the direction from which the source signal was received. Accordingly, the first retro-directional transceiver module includes a relative phase determinator determines the relative phase between the signal received at one of the antennas and the signals received at each one of the other antennas. The relative phase determinator determines a respective phase-shift associated with each one of the phase-shifters at least according to the respective detected relative phases between the received signals (e.g., the negative of the detected relative phases). The relative phase determinator provides these determined relative phases to the respective phase-shifters. Thus, the sub-system only stores the signal received at the one antenna. Reference is now made to FIG. 2, which is a schematic illustration of a first retro-directional transceiver sub-system, generally referenced 120, constructed and operative in accordance with another embodiment of the disclosed technique. First retro-directional transceiver sub-system 120 corresponds to first retro-directional transceiver sub-system 104 in FIG. 1. Sub-system 120 includes a plurality of antennas $122_1$, $122_2$, ..., $122_N$, a signal source generator 126, a relative phase determinator 128 and a plurality of transceiver modules $123_1$, $123_2$, ..., $123_N$ (abbreviated $T_XR_X$ in FIG. 3). Each transceiver module includes a respective receiver, phase-shifter and amplifier. Transceiver module $123_1$ includes receiver $124_1$, phase-shifter $130_1$ and amplifier $132_1$. Transceiver module $123_2$ includes receiver $124_2$, phase-shifter $130_2$ and amplifier $132_2$. Transceiver module $123_N$ includes receiver $124_N$, phase-shifter $130_N$ and amplifier $132_N$. Each one of phase-shifters $130_1$, $130_2$, ..., $130_N$ may be a true phase shifter or a true time delay phase shifter. At least one of the transceiver modules is defined as a reference transceiver module. In FIG. 1, transceiver module $123_1$ is defined as the reference transceiver module. It is noted the generally, the phase-shifter of the reference transceiver module is optional (i.e., the reference transceiver module does not have to have a phase shifter). Thus, in transceiver module $123_1$, phase-shifter $130_1$ is optional. It is further noted that Signal source generator 128, together with the phase-shifter and the amplifier respective of each transceiver module form the transmitter of that transceiver module.

Each one of antennas $122_1$, $122_2$, ..., $122_N$ is coupled with a respective one of receivers $124_1$, $124_2$, ..., $124_N$ and with a respective one of amplifiers $132_1$, $132_2$, ..., $132_N$. Each one of amplifiers $132_1$, $132_2$, ..., $132_N$ is further coupled with a respective one of phase-shifters $130_1$, $130_2$, ..., $130_N$. Signal source 126 is coupled with receiver $124_1$ and with each one of phase-shifters $130_2$, $130_2$, ..., $130_N$. Relative phase determinator 128 is coupled with each one of receivers 124$_1$, 124$_2$, ..., 124$_N$ and with each one of phase-shifters 130$_1$, 130$_2$, ..., 130$_N$.

Each one of receivers 124$_1$, 124$_2$, ..., 124$_N$ receives a source signal, transmitted by a source (not shown), via the respective antenna thereof. Receiver 124$_1$ receives the source signal via antenna 122$_1$, receiver 124$_2$ receives the source signal via antenna 122$_2$ and receiver 124$_N$ receives the source signal via antenna 122$_N$. Each one of receivers 124$_1$, 124$_2$, ..., 124$_N$ performs down conversion, filtering sampling and the like. Receivers 124$_1$, 124$_2$, ..., 124$_N$ provide the received signal thereof to relative phase determinator 128. Receiver 124$_1$ provides the received signal thereby to signal source generator 126 and to relative phase determinator 128. Signal source generator 126 determines an intermediate signal according to the received signal. Signal source generator 126 determines this intermediate signal by determining first received signal parameters, and generates the intermediate signal according to these first received signal parameters (i.e., signal source generator synthesizes the intermediate signal). These first received signal parameters are, for example, the frequency, the phase and the amplitude of the received signal. These first received signal parameters may further be the pulse rise and fall time and the intra-pulse modulation scheme (e.g., linear and non-linear frequency modulation, phase modulations such as Phase Shift Keying and Amplitude Modulation). Signal source generator 126 determines the first received signal parameters according to signal processing techniques. For example, the frequency may be determined according to the Fourier Transform of the received signal. The frequency of the received signal may alternatively be determined according to the rate of change of the phase of the signal. The pulse width may be determined by determining the start time and the end time of the pulse. Alternatively, signal source generator 126 stores the received signal. Signal source generator 126 determines an intermediate signal according to stored received signal (i.e., either the stored signal is output from the signal source generator directly or the signal source generator re-produces the stored signal accordingly). According to yet another alternative, signal source generator 126 stores the received signal, determines first received signal parameters of the received signal and generates the intermediate signal accordingly. Signal source generator 126 may further modulate this intermediate signal (e.g., frequency modulation, phase modulation, amplitude modulation, pulse width modulation) delay or filter the intermediate signal. Signal source generator 126 may also modulate the signal according to information to be transmitted to the signal source (e.g., a message to a mobile device in a cellular network).

Relative phase determinator 128 detects the relative phase, for example, between the signal received by receiver 124$_1$ respective of reference transceiver module 123$_1$ and the signal received by each one of receivers 124$_2$, ..., 124$_N$ respective of transceiver modules 123$_2$, ..., 123$_N$. Alternatively, relative phase determinator 128 detects the relative phase between the signals received by each adjacent pair of receivers (e.g., between receiver 124$_1$ and receiver 124$_2$, between receiver 124$_2$ and receiver 124$_3$ etc.). In general, relative phase determinator 128 performs N−1 independent measurements of the relative phase between the receivers (i.e., N equals the number of receivers).

Relative phase determinator 128 further determines a respective phase-shift associated with each one of phase-shifters 130$_1$, 130$_2$, ..., 130$_N$ at least according to detected relative phases between the signals received by the receivers. Relative phase determinator 128 determines these respective phase shifts such that the re-transmitted signal will be transmitted at least, substantially towards the direction from which the source signal was received (e.g., according to the negative of the detected relative phases of the received signals). Relative phase determinator 128 may further determine the respective phase-shift associated with each one of phase-shifters 130$_1$, 130$_2$, ..., 130$_N$ according to required additional transmission effects (e.g., multi-beam, de-focusing) to be introduced to the re-transmitted signal. Relative phase determinator 128 provides each determined phase-shift to the respective one of phase-shifters 130$_1$, 130$_2$, ..., 130$_N$.

Thereafter, signal source generator 126 provides the intermediate signal determined thereby to each one of phase-shifters 130$_1$, 130$_2$, ..., 130$_N$. Each one of phase-shifters 130$_1$, 130$_2$, ..., 130$_N$ shifts the phase of the intermediate signal by the respective phase shift associated with that phase-shifter. Each one of phase-shifters 130$_1$, 130$_2$, ..., 130$_N$ may further shift the phase of the intermediate signal to introduce additional effects (e.g., de-focusing, multi-beam). Each one of phase-shifters 130$_1$, 130$_2$, ..., 130$_N$ provides the respective phase shifted signal to the respective amplifier thereof. Phase-shifter 130$_1$ provides the respective phase shifted signal to amplifier 132$_1$, Phase-shifter 130$_2$ provides the respective phase shifted signal to amplifier 132$_2$ and phase-shifter 130$_N$ provides the respective phase shifted signal to amplifier 132$_N$. Each one of amplifiers 132$_1$, 132$_2$, ..., 132$_N$ amplifies the respective signal thereof and provides the respective amplified signal, to the respective antenna associated therewith. Amplifier 132$_1$ provides the respective amplified signal to the antenna 122$_1$, amplifier 132$_2$ provides the respective amplified signal to the antenna 122$_2$ and amplifier 132$_N$ provides the respective amplified signal to the antenna 122$_N$. Each of antennas 122$_1$, 122$_2$, ..., 122$_N$ transmits the respective signal thereof. Since the signal transmitted by each of antennas 122$_1$, 122$_2$, ..., 122$_N$ includes a respective phase-shift (i.e., introduced by phase-shifters 130$_1$, 130$_2$, ..., 130$_N$ respectively), the re-transmitted signal is transmitted at least substantially toward the direction from which the sources signal was received. Thus, the relative position between each pair of antennas need not be known to determine the direction of the re-transmitted signal. The re-transmitted signal may be transmitted to additional directions (e.g., due to grating lobes).

It is noted that in general, the output signal of signal source generator 126 and phase-shifters 130$_1$, 130$_2$, ..., 130$_N$ is a digital signal and a digital to analog converter (not shown in FIG. 2) precedes each of amplifiers 132$_1$, 132$_2$, ..., 132$_N$. However, the digital to analog converter may precede each of phase-shifters 130$_2$, ..., 130$_N$. It is further noted that the change in the phase of the signal during the propagation thereof between reference receiver 124$_1$ and signal source generator 126 and between signal source generator 126 and each of phase-shifter 130$_1$, 130$_2$, ..., 130$_N$ should at least be known, and thus compensated for by relative phase determinator 128. Alternatively, the change in the phase of the signal during the propagation thereof between reference receiver 124$_1$ and signal source generator 126 and between signal source generator 126 and each of phase-shifter 130$_1$, 130$_2$, ..., 130$_N$ should be substantially the same.

Figure 3:
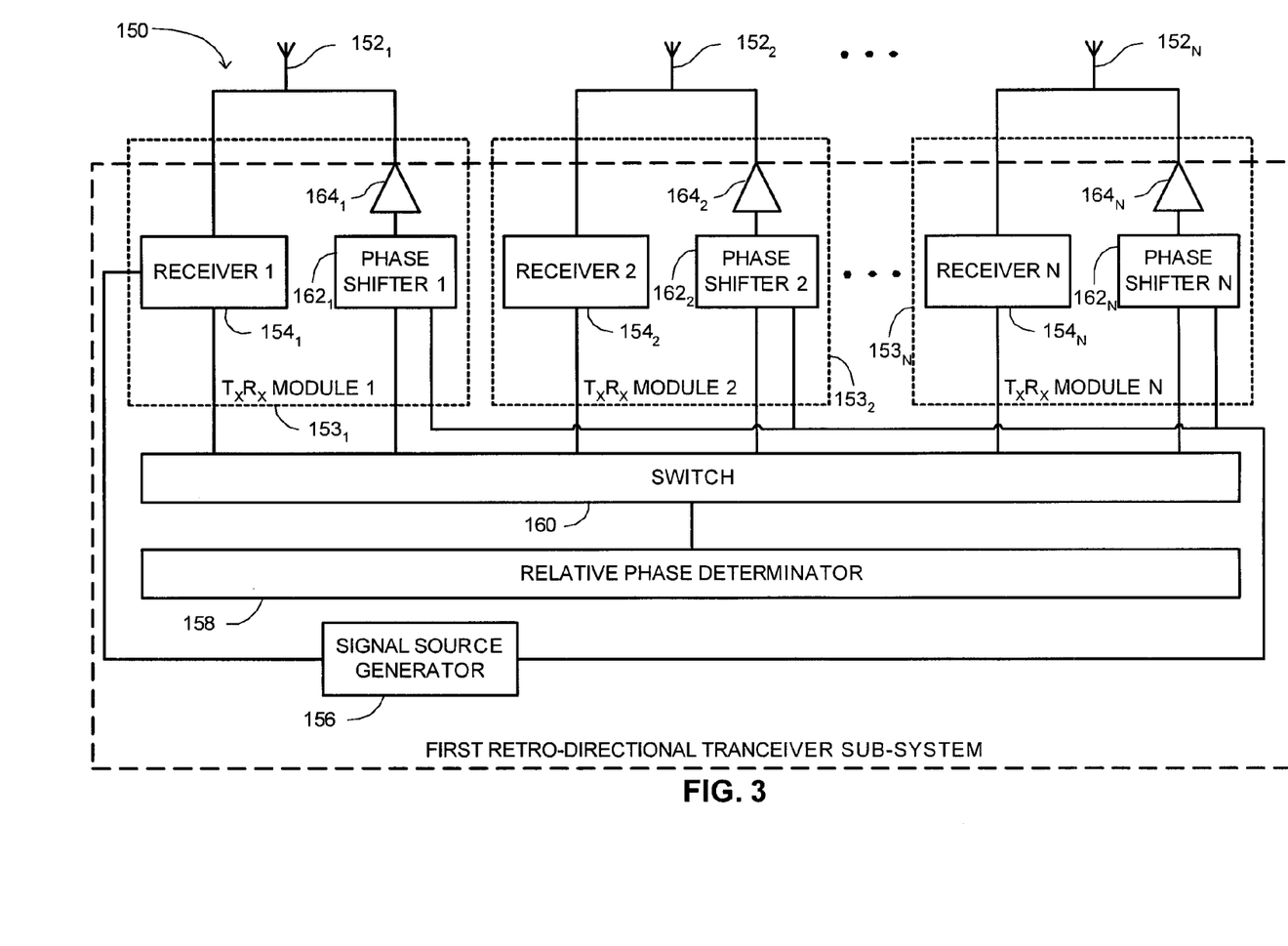
FIG. 3 is a schematic illustration of a first retro-directional transceiver sub-system, constructed and operative in accordance with a further embodiment of the disclosed technique.

According to a further embodiment of the disclosed technique, the first retro-directional transceiver sub-system includes relative phase determinator and a switch. The switch sequentially couples the relative phase determinator with a pair of receivers according to a switching scheme. This switching scheme includes, for example, coupling the reference receiver with the relative phase determinator and sequentially coupling each one of the other receivers with the relative phase determinator. The relative phase determinator detects the relative phase between the signal at the reference receiver and the signals received at each one of the other receivers. The relative phase determinator determines a respective phase-shift associated with each one of the phase-shifters at least according to the respective detected relative phases. Thereafter, the switch sequentially couples the relative phase determinator with each one of the phase-shifters and the relative phase determinator provides these determined phases to the respective phase-shifters. Reference is now made to FIG. 3, which is a schematic illustration of a first retro-directional transceiver sub-system generally referenced 150, constructed and operative in accordance with a further embodiment of the disclosed technique. System 150 includes a plurality of antennas $152_1, 152_2, \ldots, 152_N$, a signal source generator 156, a relative phase determinator 158, a switch 160 and a plurality of transceiver modules $153_1, 153_2, \ldots, 153_N$ (abbreviated $T_XR_X$ in FIG. 3). Each transceiver module includes a respective receiver, phase-shifter and amplifier. Transceiver module $153_1$ includes receiver $154_1$, phase-shifter $162_1$ and amplifier $164_1$. Transceiver module $153_2$ includes receiver $154_2$, phase-shifter $162_2$ and amplifier $164_2$. Transceiver module $153_N$ includes receiver $154_N$, phase-shifter $162_N$ and amplifier $164_N$. Each one of phase-shifters $162_1, 162_2, \ldots, 162_N$ may be a true phase shifter or a true time delay phase shifter. At least one of the transceiver modules is defined as a reference transceiver module. In FIG. 3, transceiver module $152_1$ is defined as the reference transceiver module. As mentioned above, the phase-shifter of the reference transceiver module is optional (i.e., the reference transceiver module does not have to have a phase shifter). Thus, in transceiver module $152_1$, phase-shifter $164_1$ is optional. It is noted that Signal source generator 156, together with the phase-shifter and the amplifier of each transceiver module form the transmitter of that transceiver module.

Each one of antennas $152_1, 152_2, \ldots, 152_N$ is coupled with a respective one of receivers $154_1, 154_2, \ldots, 154_N$ and with a respective one of amplifiers $164_1, 164_2, \ldots, 164_N$. Each one of antennas $152_1, 152_2, \ldots, 152_N$ is further coupled with a respective one of phase-shifters $162_1, 162_2, \ldots, 162_N$. Signal source generator 156 is coupled with receiver $154_1$ and each one of phase-shifters $162_1, 162_2, \ldots, 162_N$. Relative phase determinator 158 is coupled with switch 160. Switch 160 is further coupled with each one of receivers $154_1, 154_2, \ldots, 154_N$ and with each one of phase-shifters $162_1, 162_2, \ldots, 162_N$.

Each one of receivers $154_1, 154_2, \ldots, 154_N$ receives a source signal, transmitted by a source, via the respective antenna thereof. Receiver $154_1$ receives the source signal via antenna $152_1$, receiver $154_2$ receives the source signal via antenna $152_2$ and receiver $154_N$ receives the source signal via antenna $152_N$. Each one of receivers $154_1, 154_2, \ldots, 154_N$ performs down conversion, filtering sampling and the like. Receiver $154_1$ provides the received signal thereby to signal source generator 156 and to relative phase determinator 158. Signal source generator 156 determines an intermediate signal according to the received signal. Signal source generator 156 determines this intermediate signal by determining first received signal parameters, and generating the intermediate signal according to these first received signal parameters (i.e., signal source generator synthesizes the intermediate signal). These first received signal parameters are, for example, the frequency, the phase and the amplitude of the received signal. These first received signal parameters may further be the pulse rise and fall time and the intra-pulse modulation scheme (e.g., linear and non-linear frequency modulation, phase modulations such as Phase Shift Keying and Amplitude Modulation). Similarly to as mentioned above signal source generator 156 determines the first received signal parameters according to signal processing techniques. Alternatively, signal source generator 156 stores the received signal. Signal source generator 156 determines an intermediate signal according to stored received signal (i.e., either the stored signal is output from the signal source generator directly or the signal source generator re-produces the stored signal accordingly). According to yet another alternative, signal source generator 156 stores the received signal and determines first signal parameters of the received signal and generates the intermediate signal accordingly. Signal source generator 156 may further modulate this intermediate signal (e.g., frequency modulation, phase modulation, amplitude modulation, pulse width modulation) delay or filter the intermediate signal. Signal source generator 156 may also modulate the signal according to information to be transmitted to the signal source (e.g., a message to a mobile device in a cellular network).

Switch 160 couples receivers $154_1, 154_2, \ldots, 154_N$ with relative phase determinator 158 according to a determined switching scheme. This switching scheme includes, for example, coupling reference receiver $154_1$ with relative phase determinator 160 and sequentially coupling receivers $154_2, \ldots, 154_N$ with relative phase determinator 158. This switching scheme may alternatively include coupling each adjacent pair of receivers $154_1, 154_2, \ldots, 154_N$. In general, the switching scheme is determined such that relative phase determinator 158 performs N−1 independent measurements of the relative phase between the receiver (i.e., N equals the number of receivers).

Relative phase determinator 158 further determines a respective phase-shift associated with each one of phase-shifters $162_1, 162_2, \ldots, 162_N$ at least according detected relative phases between the signals received by the receivers. Relative phase determinator 158 determines these respective phase shifts such that the re-transmitted signal will be transmitted at least, substantially towards the direction from which the source signal was received (e.g., according to the negative of the detected relative phases of the received signals). Relative phase determinator 158 may further determine the respective phase-shift associated with each one of phase-shifters $162_1, 162_2, \ldots, 162_N$ according to required additional transmission effects (e.g., multi-beam, de-focusing) to be introduced to the re-transmitted signal. Switch 160 couples relative phase determinator 158 with each one of phase-shifters $162_1, 162_2, \ldots, 162_N$ (i.e., according to a switching scheme) and relative phase determinator 158 provides each determined phase-shift to the respective one of phase-shifters $162_1, 162_2, \ldots, 162_N$. Switch 160 couples relative phase determinator 158 with each one of phase-shifters $162_1, 162_2, \ldots, 162_N$, for example, sequentially after all the respective phase shifts associated with phase-shifters $162_1, 162_2, \ldots, 162_N$ are determined. Alternatively, switch 160 couples relative phase determinator 160 with each one of phase-shifters $162_1, 162_2, \ldots, 162_N$, for example, after relative phase determinator 158 determines the respective phase shift associated with the respective one of phase-shifters $162_1, 162_2, \ldots, 162_N$.

Thereafter, signal source generator 156 provides the intermediate signal determined thereby to each one of phase-shifters $162_1, 162_2, \ldots, 162_N$. Each one of phase-shifters $162_1, 162_2, \ldots, 162_N$ shifts the intermediate signal by the respective phases shift associated with that phase-shifter. Each one of phase-shifters $162_1, 162_2, \ldots, 162_N$ shifts phase of the intermediate signal by the respective phases shift associated with that phase-shifter. Each one of phase-shifters $162_1, 162_2, \ldots, 162_N$ may further shift the phase of the intermediate signal to introduce additional effects (e.g., defocusing, multi-beam). Each one of phase-shifters $162_1$, $162_2, \ldots, 162_N$ provides the respective phase shifted signal thereof to the respective amplifier thereof. Phase-shifter $162_1$ provides the respective phase shifted signal to amplifier $164_1$. Phase-shifter $162_2$ provides the respective phase shifted signal to amplifier $164_2$ and phase-shifter $162_N$ provides the respective phase shifted signal to amplifier $164_N$. Each one of amplifiers $164_1, 164_2, \ldots, 164_N$ provides the respective amplified signal, to the respective antenna associated therewith. Amplifier $164_1$ provides the respective amplified signal to the antenna $152_1$, amplifier $164_2$ provides the respective amplified signal to the antenna $152_2$ and amplifier $164_N$ provides the respective amplified signal to the antenna $152_N$. Each of antennas $152_1, 152_2, \ldots, 152_N$ re-transmits the respective signal thereof. Since the signal transmitted by each of antennas $152_1, 152_2, \ldots, 152_N$ includes a respective phase-shift (i.e., introduced by phase-shifters $162_1$, $162_2, \ldots, 162_N$ respectively), the re-transmitted signal is transmitted at least substantially toward the direction from which the source signal was received. Thus, the relative position between each pair of antennas need not be known to determine the direction of the re-transmitted signal. The re-transmitted signal may be transmitted to additional directions (e.g., due to grating lobes).

It is noted that in general, the output signal of signal source generator 156 and phase-shifters $162_1, 162_2, \ldots, 162_N$ is a digital signal and a digital to analog converter (not shown in FIG. 3) precedes each of amplifiers $164_1, 164_2, \ldots, 164_N$. However, the digital to analog converter may precede each of phase-shifters $162_1, 162_2, \ldots, 162_N$. It is further noted that the change in the phase of the signal during the propagation thereof between reference receiver $154_1$ and signal source generator 156 and between signal source generator 156 and each of phase-shifter $162_1, 162_2, \ldots, 162_N$ should at least be known, and thus compensated for by relative phase determinator 158. Alternatively the change in the phase of the signal during the propagation thereof between reference receiver $154_1$ and signal source generator 156 and between signal source generator 156 and each of phase-shifter $162_1$, $162_2, \ldots, 162_N$ should be substantially the same.

Figure 4A:
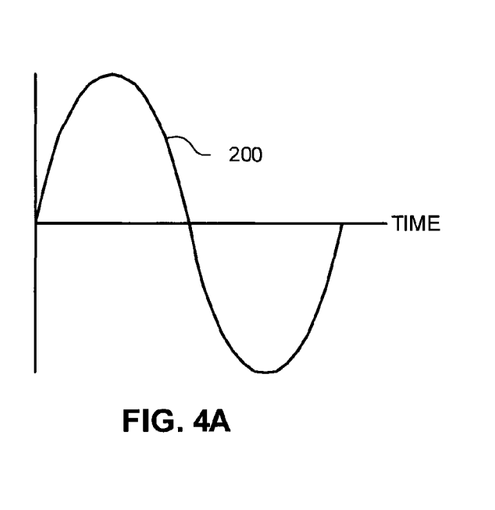
FIG. 4A is a representation of a signal received by one of the antennas in the antenna array.
Figure 4B:
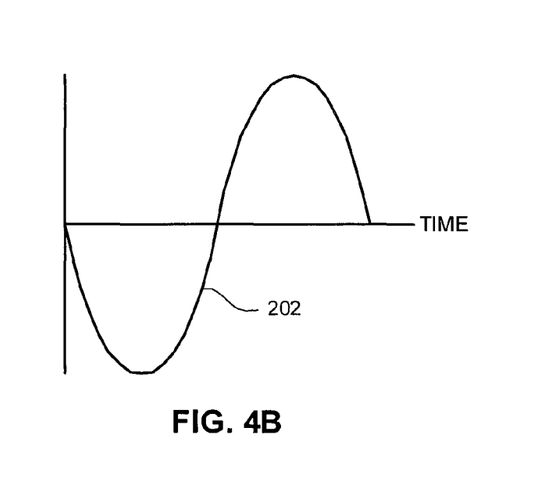
FIG. 4B is a time reversed version with respect to the signal in FIG. 4A.

According to another embodiment of the disclosed technique, the first retro-directional transceiver sub-system transmits, by each antenna in the antenna array, a reversed time version of the signal received by the same antenna. Thus, the relative phase of re-transmitted signals, between each pair of antennas, is substantially the negative of relative phase of the received source signal between the same pair of antennas. Reference is now made to FIGS. 4A and 4B. In FIG. 4A signal 200 is a representation of a signal received by one of the antennas in the antenna array. In FIG. 4B, signal 202 is time reversed version with respect to signal 200 (FIG. 4A). Signal 202 is transmitted by the same antenna that received signal 200.

Figure 4C:
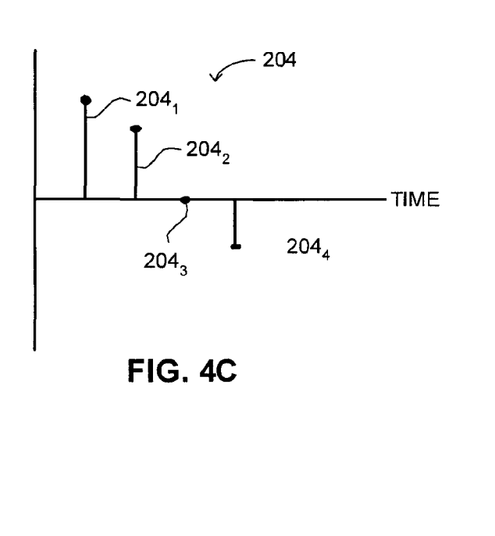
FIG. 4C is a representation of a discrete signal which includes impulses received by one of the antennas in the antenna array.
Figure 4D:
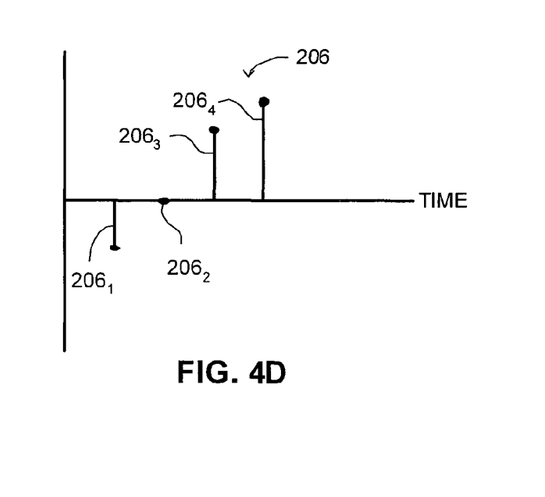
FIG. 4D is a time reversed with respect to in FIG. 4C.

Reference is now made to FIGS. 4C and 4D. In FIG. 4C signal 204 is a representation of a discrete signal which includes impulses $204_1, 204_2, 204_3$ (i.e., exhibiting a value of zero) and $204_4$ received by one of the antennas in the antenna array. In FIG. 4D, signal 206 is time reversed with respect to signal 204 (FIG. 4C). Signal 206 includes impulses $206_1$ (i.e., corresponding to impulse $204_4$ in FIG. 4C), $206_2$ (i.e., corresponding to impulse $204_3$ in FIG. 4C), $206_3$ (i.e., corresponding to impulse $204_2$ in FIG. 4C) and $206_4$ (i.e., corresponding to impulse $204_1$ in FIG. 4C). Signal 206 is transmitted by the same antenna that received signal 204. In general a discrete reversed signal is produced by placing the first impulse last, the second impulse second to last etc.

Figure 4E:
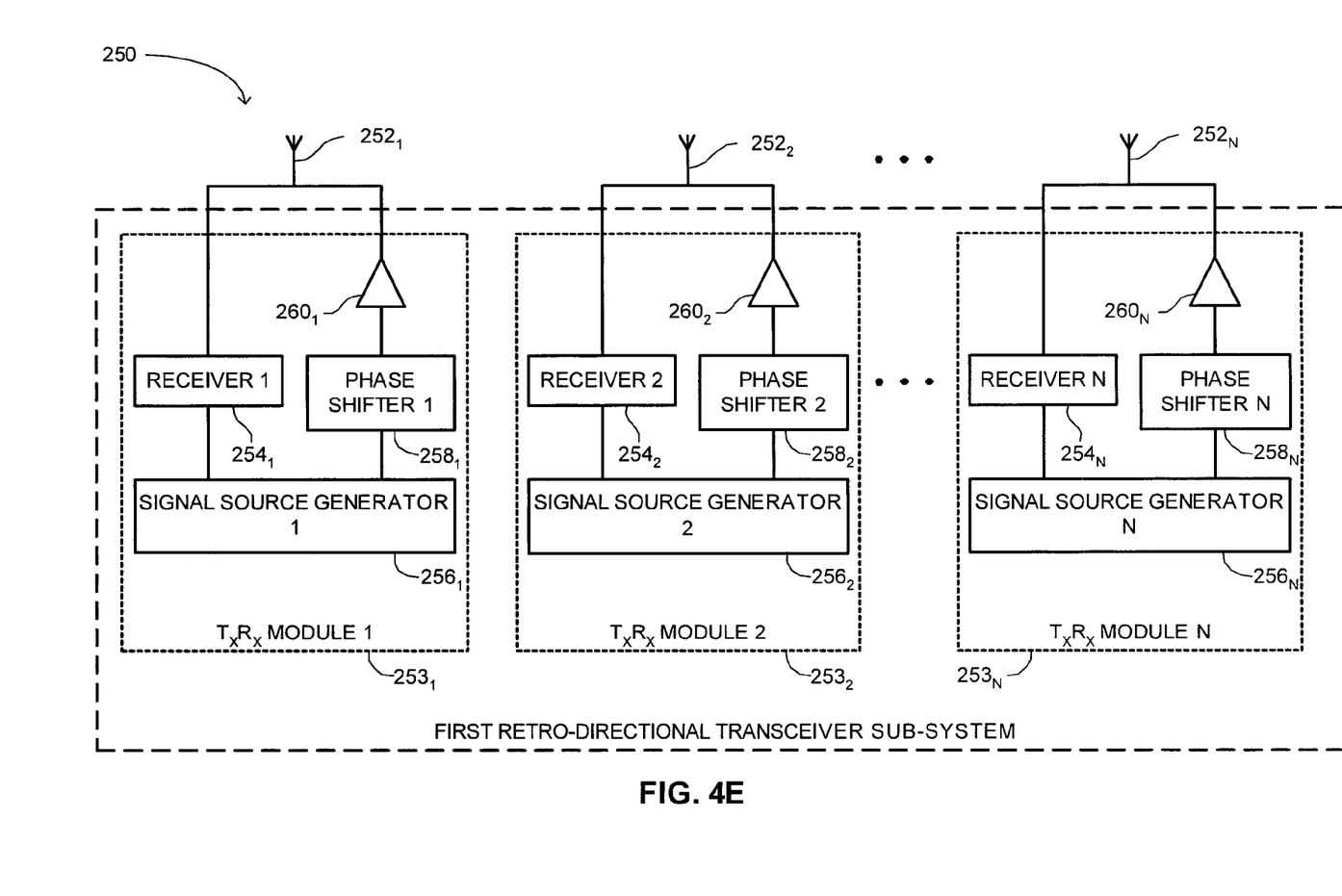
FIG. 4E is a schematic illustration of a first retro-directional transceiver sub-system constructed and operative in accordance with another embodiment of the disclosed technique.

Reference is now made to FIG. 4E, which is a schematic illustration of a first retro-directional transceiver sub-system, generally referenced 250, constructed and operative in accordance with another embodiment of the disclosed technique. System 250 includes a plurality of antennas $252_1, 252_2, \ldots, 252_N$, and a plurality of transceiver modules $253_1, 253_2, \ldots, 253_N$ (abbreviated $T_X R_X$ in FIG. 2E). Each transceiver module includes a respective receiver, source signal generator, phase-shifter and amplifier. Transceiver module $253_1$ includes receiver $254_1$, source signal generator $256_1$, phase-shifter $258_1$ and amplifier $260_1$. Transceiver module $253_2$ includes receiver $254_2$, source signal generator $256_2$, phase-shifter $258_2$ and amplifier $260_2$. Transceiver module $253_N$ includes receiver $254_N$, source signal generator $256_N$, phase-shifter $258_N$ and amplifier $260_N$. The signal source generator, the phase-shifter and the amplifier of each transceiver module form the transmitter of that transceiver module.

Each one of antennas $252_1, 252_2, \ldots, 252_N$ is coupled with a respective one of receivers $254_1, 254_2, \ldots, 254_N$ and with a respective one of amplifiers $260_1, 260_2, \ldots, 260_N$. Antenna $252_1$ is coupled with receivers $254_1$ and with amplifier $260_1$. Antenna $252_2$ is coupled with receiver $254_2$ and with amplifier $260_2$. Antenna $252_N$ is coupled with receiver $254_N$ and with amplifier $260_N$. Each one of signal source generators $256_1, 256_2, \ldots, 256_N$ is coupled with a corresponding one of receivers $254_1, 254_2, \ldots, 254_N$, and with a corresponding one of phase-shifters $258_1, 258_2, \ldots, 258_N$. Signal source generator $256_1$ is coupled with receiver $254_1$ and with phase-shifter $258_1$, signal source generator $256_2$ is coupled with receiver $254_2$ and with phase-shifter $258_2$, signal source generator $256_N$ is coupled with receiver $254_N$ and with phase-shifter $258_N$. Each one of phase-shifters $258_1, 258_2, \ldots, 258_N$ is further coupled with a respective one of amplifiers $260_1$, $260_2, \ldots, 260_N$. Phase-shifters $258_1$ is coupled with amplifier $260_1$. Phase-shifters $258_2$ is coupled with amplifier $260_2$. Phase-shifters $258_N$ is coupled with amplifier $260_N$.

Each one of receivers $254_1, 254_2, \ldots, 254_N$ receives a source signal, transmitted by a source, via the respective antenna thereof. Receiver $254_1$ receives the source signal via antenna $252_1$, receiver $254_2$ receives the source signal via antenna $252_2$ and receiver $254_N$ receives the source signal via antenna $252_N$. Each one of receivers $254_1, 254_2, \ldots, 254_N$ performs down conversion, filtering sampling and the like and provides the received signal thereby to the respective signal source generator thereof. Receiver $254_1$ provides the respective received signal thereof to signal source generator $256_1$, receiver $254_2$ provides the respective received signal thereof to signal source generator $256_2$ and receiver $254_N$ provides the respective received signal thereof to signal source generator $256_N$. Each one of signal source generators $256_1, 256_2, \ldots, 256_N$ determines a respective intermediate signal according to the respective received signal thereof. This intermediate signal is at least time reversed with respect to the received signal. Each one of signal source generators $256_1, 256_2, \ldots, 256_N$ determines the respective intermediate signal by determining first received signal parameters of the respective received signal thereof, and generates the respective intermediate signal thereof according to these first received signal parameters (i.e., each one of signal source generator $256_1, 256_2, \ldots, 256_N$ synthesizes the respective intermediate signal). These first received signal parameters are, for example, the frequency, the phase and the amplitude of the received signal. These first received signal parameters may further be the pulse rise and fall time and the intra-pulse modulation scheme (e.g., linear and non-linear frequency modulation, phase modulations such as Phase Shift Keying and Amplitude Modulation). Alternatively, each one signal source generator $256_1$, $256_2$, ..., $256_N$ stores the respective received signal thereof. Each one of signal source generators $256_1$, $256_2$, ..., $256_N$ determines the respective intermediate signal thereof according to the respective stored received signal (i.e., either the stored signal is output from the signal source generator directly or the signal source generator reproduces the stored signal accordingly). According to yet another alternative, each one of signal source generators $256_1$, $256_2$, ..., $256_N$ stores the respective received signal, determines received first signal parameters of the respective received signal and generates the intermediate signal accordingly. Each one of signal source generators $256_1$, $256_2$, ..., $256_N$ may further modulate the respective intermediate signal thereof (e.g., frequency modulation, phase modulation, amplitude modulation, pulse width modulation) delay or filter the respective intermediate signal. In general, the intermediate signal generated by each signal source generator $256_1$, $256_2$, ..., $256_N$ is at least the reversed time version of the respective received signal.

Thereafter, each one of signal source generator $256_1$, $256_2$, ..., $256_N$ provide the respective intermediate signal thereof to the corresponding phase-shifter thereof. Signal source generator $256_1$ provides the respective intermediate signal thereof to phase-shifter $258_1$. Signal source generator $256_2$ provides the respective intermediate signal thereof to phase-shifter $258_2$. Signal source generator $256_N$ provides the respective intermediate signal thereof to phase-shifter $258_N$. Each one of phase-shifters $258_1$, $258_2$, ..., $258_N$ shifts the respective intermediate signal thereof by the respective phase shift associated with each of phase-shifters $258_1$, $258_2$, ..., $258_N$. The phase shift associated with each of phase-shifters $258_1$, $258_2$, ..., $258_N$ is determined according to required additional transmission effects (e.g., multi-beam, de-focusing) to be introduced to the re-transmitted signal.

Each one of phase-shifters $258_1$, $258_2$, ..., $258_N$ provides the respective phase shifted signal thereof to the respective amplifier coupled therewith. Phase-shifter $258_1$ provides the respective phase shifted signal thereof to amplifier $260_1$. Phase-shifter $258_2$ provides the respective phase shifted signal thereof to amplifier $260_2$. Phase-shifter $258_N$ provides the respective phase shifted signal thereof to amplifier $260_N$. Each one of amplifiers $260_1$, $260_2$, ..., $260_N$ amplifies the respective signal thereof and provides the respective amplified signal, to the respective antenna associated therewith. Amplifier $260_1$ provides the respective amplified signal to the antenna $252_1$, amplifier $260_2$ provides the respective amplified signal to the antenna $252_2$ and amplifier $260_N$ provides the respective amplified signal to the antenna $252_N$. Thus, each of antennas $252_1$, $252_2$ ..., $252_N$ re-transmits the respective signal thereof. Since the signal transmitted by each of antennas $252_1$, $252_2$, ..., $252_N$ includes at least the time reversed version of the received signal the re-transmitted signal is transmitted at least substantially toward the direction from which the sources signal was received. Thus, the relative position between each pair of antennas need not be known to determine the direction of the re-transmitted signal. The re-transmitted signal may be transmitted to additional directions (e.g., due to grating lobes).

It is noted that in general, the output signal of signal source generators $256_1$, $256_2$, ..., $256_N$ and phase-shifters $258_1$, $258_2$, ..., $258_N$ is a digital signal. A corresponding digital to analog converters (not shown in FIG. 3E) precedes each of amplifiers $260_1$, $260_2$, ..., $260_N$. However, a digital to analog converters may precede each of phase-shifters $258_1$, $258_2$, ..., $258_N$. It is further noted that in FIG. 3E, phase-shifters $258_1$, $258_2$, ..., $258_N$ are optional. When no additional effects are required then phase-shifters $258_1$, $258_2$, ..., $258_N$ may be omitted and each one of signal source generators $256_1$, $256_2$, ..., $256_N$ is directly coupled with a respective one of amplifiers $260_1$, $260_2$, ..., $260_N$.

The systems described hereinabove in conjunction with FIGS. 1, 2 and 3E are similarly applicable to one two and three dimensional arrays. For example, in two dimensional arrays, the relative phase determinator detects the relative phase between the received signal by a reference receiver and the received signal in each one of the other receivers in the antenna array.

Figure 5:
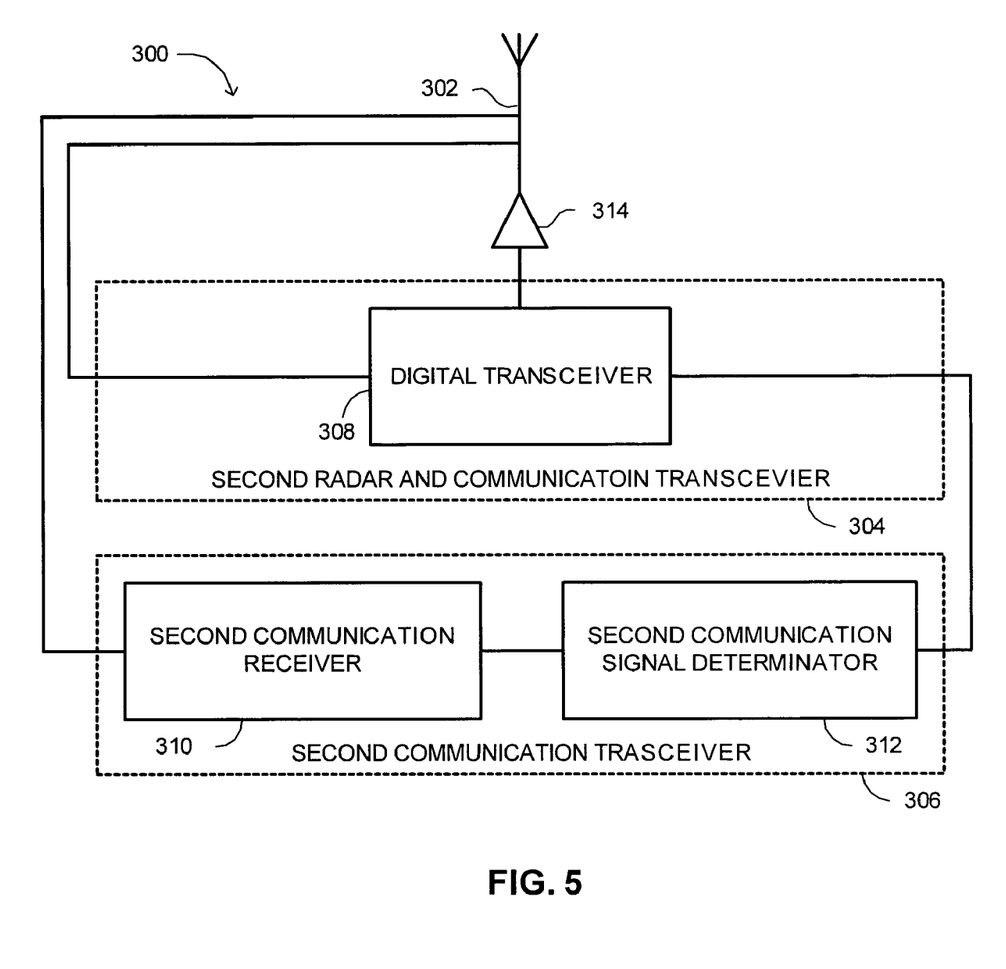
FIG. 5 is a schematic illustration of a second transmitting sub-system constructed and operative in accordance with a further embodiment of the disclosed technique.

As mentioned above, second transmitting sub-system transmits a signal between the VHF band and the UHF band. The signal may be, for example, a communication signal or a RADAR signal. Reference is now made to FIG. 5, which is a schematic illustration of a second transmitting sub-system, generally referenced 300, constructed and operative in accordance with a further embodiment of the disclosed technique. Second transmitting sub-system 300 includes second RADAR and communication transceiver 304, second communication transceiver 306 and antenna 302. Second RADAR and communication transceiver 304 includes digital transceiver 308. Second communication transceiver 306 includes second communication receiver 310 and second communication signal determinator 312. Antenna 302 is coupled with digital transceiver 308, with second communication receiver 310 and with amplifier 314. Digital transceiver 308 is coupled with amplifier 314 and with second communication signal determinator 312. Second communication receiver 310 is further coupled with second communication signal determinator 312.

Digital transceiver 308 receives a signal from antenna 302 and directly samples the received signal. Digital transceiver 308 determines second received signal parameters. These second received signal parameters are, for example, the frequency, the phase and the amplitude of the received signal. These second received signal parameters may further be the pulse rise and fall time and the intra-pulse modulation scheme (e.g., linear and non-linear frequency modulation, phase modulations such as Phase Shift Keying and Amplitude Modulation). Second communication receiver 310 receives a communication signal and performs down conversion, filtering, sampling and the like and provides the received signal thereby to second communication signal determinator 312. Second communication signal determinator 312 determines received communication signal parameters of the received signal. Similarly to as mentioned above, digital transceiver 308 and second communication signal determinator 312 determine the communication signal parameters respective of the signals received thereby, according to signal processing techniques. Second communication signal determinator 312 provides the determined communication signal parameters to digital transceiver 308. Digital transceiver 308 synthesizes a retransmitted signal according to the signal parameters determined thereby, and according to the signal parameters determined by second communication signal determinator 312, and provides the determined retransmitted signal to amplifier 314. Amplifier 314 amplifies the determined retransmitted signal and provides the amplified signal to antenna 302. Antenna 302 re-transmits the amplified signal. Similar to antenna 100 (FIG. 1) antenna 302 may be embodied as a blade antenna.

Figure 6:
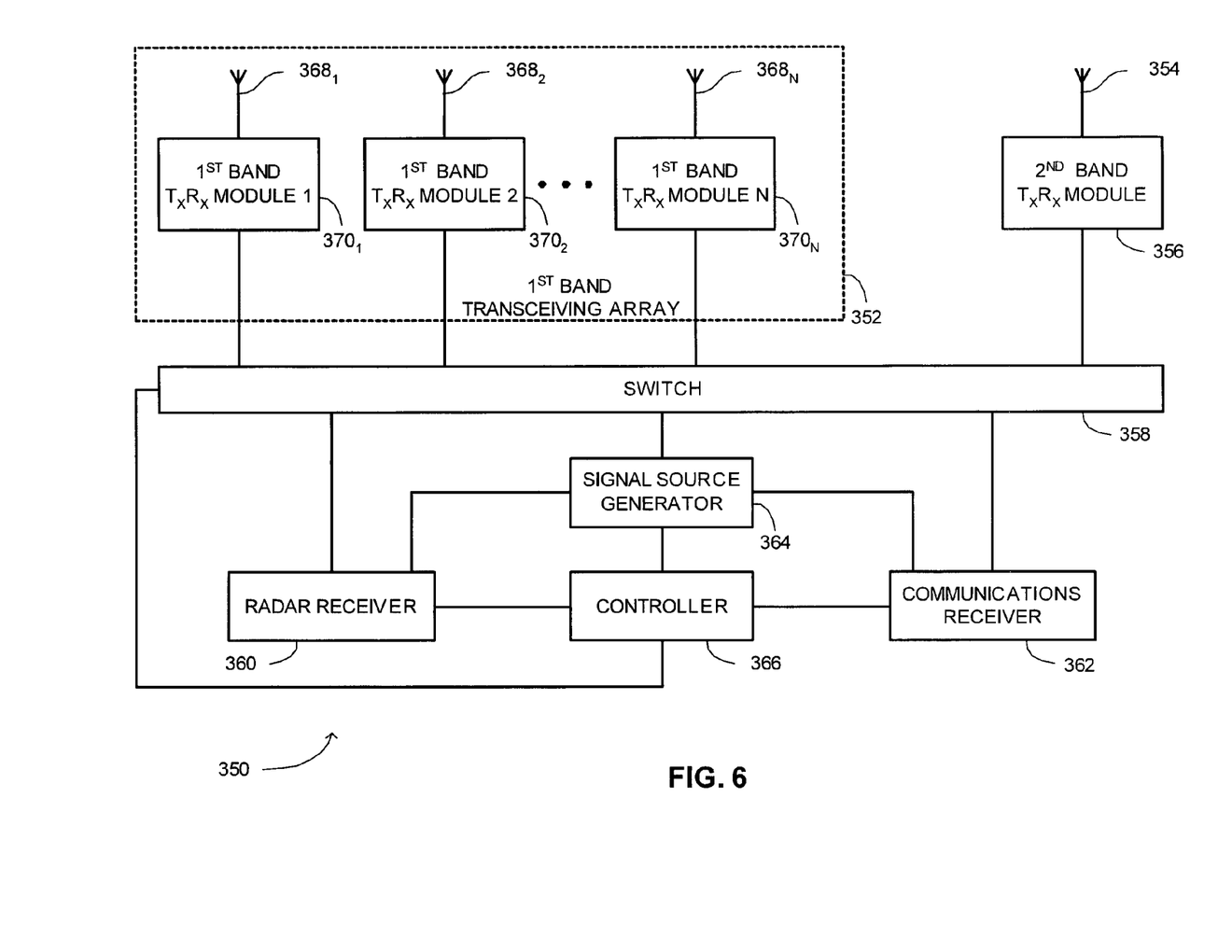
FIG. 6 is a schematic illustration of a low frequency tactical ECM system constructed an operative in accordance with another embodiment of the disclosed technique.

The low frequencies tactical ECM system described above includes two sub-systems. However, according to the disclosed technique low frequencies tactical ECM system may be integrated into a dual function single system. Reference is now made to FIG. 6, which is a schematic illustration of a low frequency tactical ECM system, generally reference 350, constructed an operative in accordance with another embodiment of the disclosed technique. System 350 includes a first band transceiving array 352, a second band transceiving antenna 354, a second-band transceiver module 356, a switch 358, a RADAR receiver 360, a communications receiver 362, a signal generator 364 and a controller 366. Transceiving array 352 includes a plurality of antennas $368_1, 368_2, \ldots, 368_N$ and corresponding first-band transceiver modules $370_1, 370_2, \ldots, 370_N$. Each one of antennas $354, 368_1, 368_2, \ldots, 368_N$ may be embodied as a blade antenna.

Signal source generator 364 is coupled with controller 366, with RADAR receiver 360, with communications receiver 362 and with switch 358. RADAR receiver 360 is further coupled with switch 358 and with controller 366. Communications receiver 362 is further coupled with switch 358 and with controller 366. Each one of first-band transceiver modules $370_1, 370_2, \ldots, 370_N$ is coupled with a corresponding one of antennas $368_1, 368_2, \ldots, 368_N$ and with switch 358. Second-band transceiver module 356 is coupled with second-band transceiving antenna 354 and with switch 358. Controller 366 is further coupled with switch 358.

Controller 366 directs switch 358 to couple first-band transceiver modules $370_1, 370_2, \ldots, 370_N$ and second-band transceiver module 356 with RADAR receiver 360 and with communications receiver 362 during a reception period. Furthermore controller 366 directs switch 358 to alternately couple source signal generator 364 with first-band transceiver modules $370_1, 370_2, \ldots, 370_N$ and with second-band transceiver module 356 during a first and a second transmission periods. Similar to controller 103 (FIG. 1), controller 366 controls the activity of system 350. This includes resources (e.g., power) management and time sharing (e.g., when harmonic signals from one band interfere with the received signal in the other band, coupling of transceiver modules $370_1, 370_2, \ldots, 370_N$ and 356 with RADAR receiver 360, with communications receiver 362 and signal source generator 364). Controller 366 further manages the different missions of system 350 such as emitter signal acquisition (i.e., recognizing the transmission of an emitter and determining the characteristics thereof) and emitter maintenance (i.e., updating the characteristics of an acquired emitter).

During a reception period transceiver modules $370_1, 370_2, \ldots, 370_N$ and 356 receives a source signal, transmitted by a source (i.e., an emitter), via the respective one of antennas $368_1, 368_2, \ldots, 368_N$ and 354. Each one of transceivers $370_1, 370_2, \ldots, 370_N$ and 356 performs down conversion, filtering sampling and the like. Each one of transceivers $370_1, 370_2, \ldots, 370_N$ and 356 provide the received signal thereof to RADAR receiver 360 and communications receiver 362. RADAR receiver 360 determines first and second received RADAR signal parameters corresponding to the first and second frequency band. Communications receiver 362 determines first and second received communications signal parameters corresponding to the first and second frequency band. As mentioned above, these signal parameters are, for example, the frequency, the phase and the amplitude of the received signal. These first received signal parameters may further be the pulse rise and fall time and the intra-pulse modulation scheme. RADAR receiver 360 and communication receiver 362 further determine a respective relative phase for each of the signals received by antennas $368_1, 368_2, \ldots, 368_N$, relative to a reference phase (e.g., the phase of a selected one of the received signals) and provide each of the determined relative phases to the respective one of transceiver modules $370_1, 370_2, \ldots, 370_N$. It is noted that, similar to as mentioned above, RADAR receiver 360 and communications receiver 362 may alter the relative phase of the re-transmitted signal to introduce additional effects to the re-transmitted signal. Furthermore, RADAR receiver 360 and communications receiver 362 provide the determined received signals parameters to signal source generator 364.

Signal source generator 364 generates a first intermediate signal according to the first received signal parameters and a second intermediate signal according to the second received signal parameters. During transmission in the first frequency band (i.e., the first transmission period), signal source generator 364 provides the first intermediate signal to transceiver modules $370_1, 370_2, \ldots, 370_N$. Each one of transceiver modules $370_1, 370_2, \ldots, 370_N$ shifts the phase of the first intermediate signal by the corresponding relative phase shift thereof, amplifies the corresponding phase shifted signal and re-transmits the amplified signal via the corresponding one of antennas $368_1, 368_2, \ldots, 368_N$. Thus, the transmitted signal the re-transmitted signal is transmitted at least substantially toward the direction from which the sources signal was received. Accordingly, the relative position between each pair of antennas need not be known to determine the direction of the re-transmitted signal. During a transmission in the second frequency band (i.e., the second transmission period), signal source generator 364 provides the second intermediate signal to transceiver modules 356. Transceiver module 356 amplifies the second intermediate signal and re-transmits the amplified signal by the corresponding antenna 354.

Figure 7:
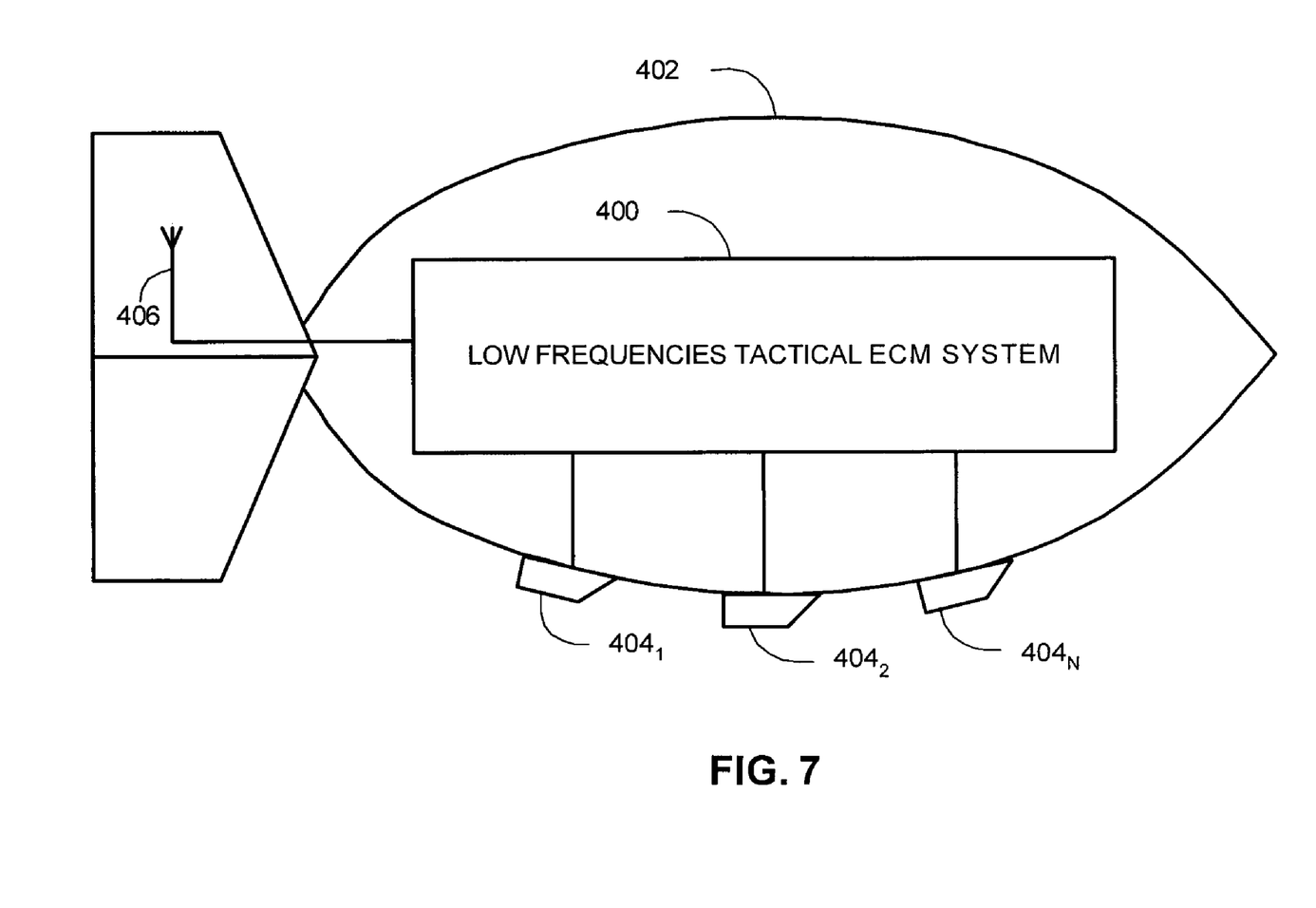
FIG. 7 is a schematic illustration of a low frequencies tactical ECM system housed within an aerodynamic container, in accordance with a further embodiment of the disclosed technique.

The low frequencies tactical ECM system according to the disclosed technique may be housed within an aerodynamic container attachable to an aircraft. Reference is now made to FIG. 7, which is a schematic illustration of a low frequencies tactical ECM system generally reference 400, housed within an aerodynamic container 402, in accordance with a further embodiment of the disclosed technique. Low frequencies tactical ECM system 400 corresponds to low frequencies tactical ECM system, generally reference 100 of FIG. 1. Aerodynamic container 402 is attachable to an aircraft. The transceiver system includes antennas $404_1, 404_2, \ldots, 404_N$ and antenna 406. Antennas $404_1, 404_2, \ldots, 404_N$ are affixed on the exterior of aerodynamic container 402 and antenna 406 is located at one of the fins of aerodynamic container 402. Thus, low frequencies tactical ECM system generally reference 400, is may be used for self protection of air crafts or for escort jamming purposes. In FIG. 6, antennas $404_1, 404_2, \ldots, 404_N$ are 'blade antennas' (i.e., antennas that are located within a body exhibiting a blade like shape), thus, maintaining the aerodynamic structure of aerodynamic container 402. Alternatively, antennas $404_1, 404_2, \ldots, 404_N$ may also be located on the fins of aerodynamic container 402. As a further alternative, antenna 406 may be affixed on the exterior of aerodynamic container 402 and be embodied as a blade antenna. Aerodynamic container 402 may be for example a pod, a munitions shell such as a bomb shell, a munitions contour (i.e., having the shape of a munitions shell by made of a different material), fuel tanks or cargo tanks. It is noted that retro-directional transceiver system 400 may be any one of transceiver system 100 described in conjunction with FIG. 1.

Figure 8:
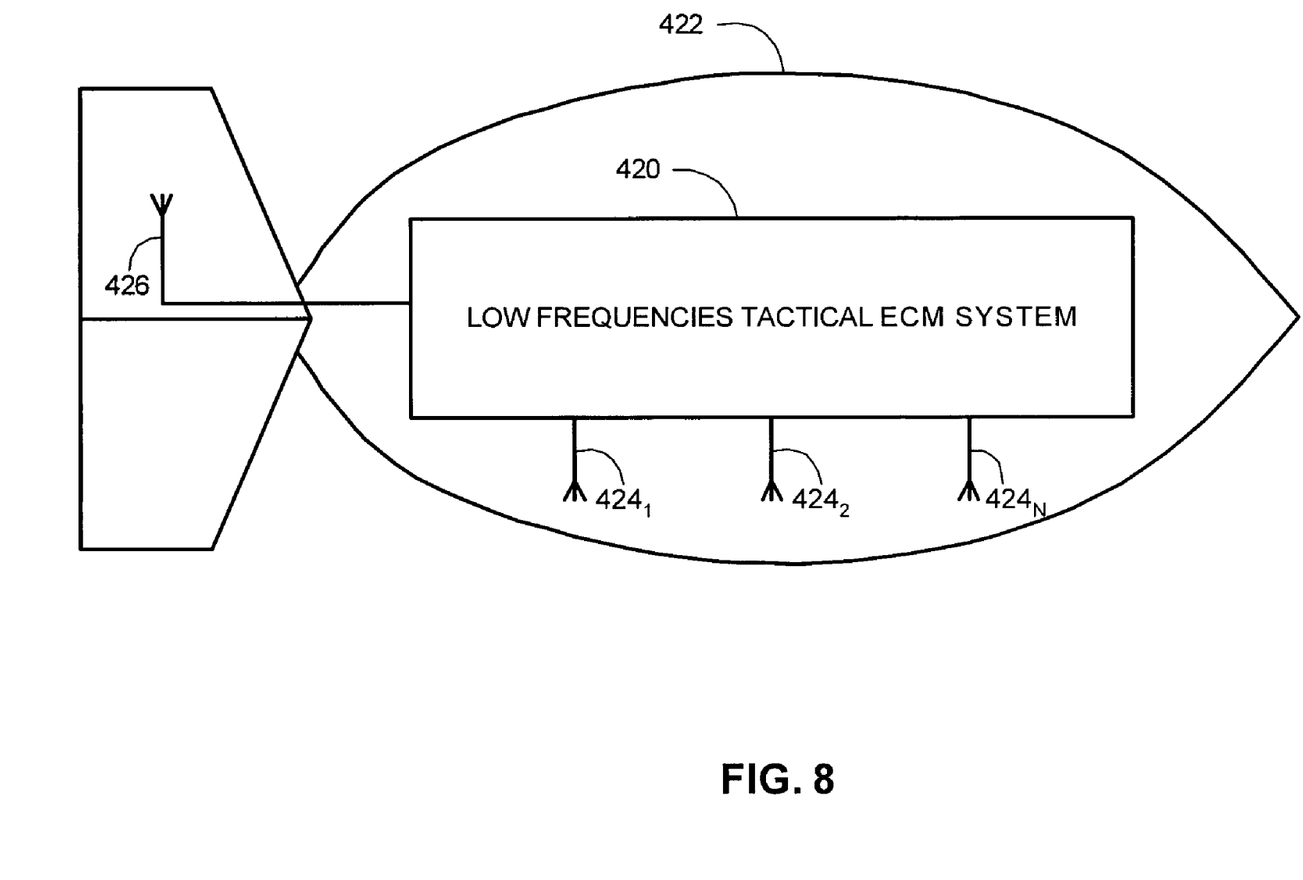
FIG. 8 is a schematic illustration of a low frequencies tactical ECM system, housed within an aerodynamic container in accordance with another embodiment of the disclosed technique.

Reference is now made to FIG. 8, which is a schematic illustration of a low frequencies tactical ECM system generally reference 420, housed within an aerodynamic container 422, in accordance with another embodiment of the disclosed technique. Low frequencies tactical ECM system 420 corresponds to low frequencies tactical ECM system, generally reference 100 of FIG. 1. Aerodynamic container 422 is attachable to an aircraft. The retro-directional transceiver system includes antennas $424_1, 424_2, \ldots, 424_N$ and antenna 426.

Antennas $424_1, 424_2, \ldots, 424_N$ are located within aerodynamic container 422 and antenna 426 is located at the one of the fins if aerodynamic container 422. Thus the exterior of aerodynamic container 422 remains unchanged. Aerodynamic container 422 may be for example a pod, a munitions shell such as a bomb shell, a munitions contour (i.e., having the shape of a munitions shell by made of a different material), fuel tanks or cargo tanks. Thus, low frequencies tactical ECM system generally reference 400, is may be used for self protection of air crafts or for escort jamming purposes. It is noted that transceiver system 420 (FIG. 7) may be any one of transceiver system 100 described in conjunction with FIG. 1. Is noted that each one of the antennas described hereinabove, may be any type of antenna (e.g., a monopole antenna, a dipole antenna, a slot antenna, a loop antenna, a spiral antenna) exhibiting any desired shape thus achieving desired properties such as bandwidth and directionality.

It will be appreciated by persons skilled in the art that the disclosed technique is not limited to what has been particularly shown and described hereinabove. Rather the scope of the disclosed technique is defined only by the claims, which follow.

The invention claimed is:

1. A tactical electronic counter measure system comprising:
   a first retro-directional transceiver sub-system, receiving signals at a first frequency band, said first retro-directional transceiver sub-system re-transmitting a signal at least substantially toward the direction from which the source signal was received, said first retro-directional transceiver sub-system including a plurality of antennas;
   a second transceiver sub-system, said second transceiver sub-system including a communication and RADAR digital transceiver and a second communication transceiver; and
   a controller, coupled with said first retro-directional transceiver sub-system and with said second transceiver sub-system, said controller controlling the activity of said first retro-directional transceiver sub-system and said second transceiver sub-system, said controller further managing the tasks of said first retro-directional transceiver sub-system and of said second transceiver sub-system, said tasks at least including emitter acquisition.

2. The system according to claim 1, wherein said first retro-directional transceiver sub-system includes:
   a plurality of transceiver modules, the number of transceiver modules equals the number of antennas, at least one of said transceiver modules being defined as a reference transceiver module, said reference transceiver module includes:
      a receiver, coupled with a respective one of said antennas, said receiver receiving a source signal from said respective one of said antennas; and
      an amplifier, coupled with said respective one antenna, said amplifier receiving an intermediate signal, said amplifier amplifying said intermediate signal and providing an amplified phase shifted signal to said respective one antenna;
   each one of the other transceiver modules include:
      a receiver, coupled with a respective one of said antennas, said receiver receiving a source signal from said respective one of said antennas;
      a phase-shifter for shifting the phase of said intermediate signal by a corresponding phase shift; and
      an amplifier, coupled with said respective one antenna and with said phase-shifter, said amplifier receiving a phase shifted signal from said phase-shifter, said amplifier amplifying said phase shifted signal and providing said amplified phase shifted signal to said respective one antenna;
   a signal source generator, coupled with the receiver of said reference transceiver module, with the phase-shifter respective of said other transceiver modules and with the amplifier respective of said reference transceiver module, said signal source generator receiving the received signal respective of the receiver of said reference transceiver module, said signal source generator generating said intermediate signal according to said received signal; and
   a relative phase determinator, coupled with each one of the receivers, and with each one of said phase-shifters, said relative phase determinator detecting the relative phase between said receiver of said reference transceiver module and each of the remaining ones of said receivers, said relative phase determinator further determines a phase shift associated with each of said phase-shifters and provides this determined phase shift to each of said phase-shifters,
   wherein, each one of said antennas transmits the respective amplified signal, thereby said antennas producing a re-transmitted signal, said antennas transmit said re-transmitted signal at least substantially toward the direction from which said source signal was received.

3. The system according to claim 2, where said reference transceiver module further includes a phase-shifter coupled between said amplifier respective of said reference transceiver module and said signal source generator, said phase-shifter respective of said reference transceiver module shifting the phase of said intermediate signal by a corresponding phase shift.

4. The system according to claim 2, wherein said phase shifter is one of a true time delay phase shifter and a true phase shifter.

5. The system according to claim 2, wherein said signal source generator determines first received signal parameters according to said received signal and generates said intermediate signal according to said first received signal parameters.

6. The system according to claim 5, wherein said first received signal parameters are selected from the group consisting of:
   frequency;
   phase;
   amplitude;
   pulse rise time;
   Pulse fall time; and
   intra-pulse modulation scheme.

7. The system according to claim 2 wherein said signal source generator stores said received signal and generates said intermediate signal according to the stored signal.

8. The system according to claim 2, wherein said signal source generator stores said received signal, determines first received signal parameters of said received signal and generates said intermediate signal accordingly.

9. The system according to claim 2, wherein said signal source generator further modulates said intermediate signal prior to providing said intermediate signal to said phase-shifters.

10. The system according to claim 9, wherein the modulation includes one of the following:
   frequency modulation;
   phase modulation;
   amplitude modulation; and
   pulse width modulation.

11. The system according to claim 2, wherein said signal source generator further delays said intermediate signal for a determined time period relative the reception of said received signal.

12. The system according to claim 2, wherein said phase shift determinator determines said phase shift associated with each of said phase-shifters further according to the detected relative phases.

13. The system according to claim 12, wherein said phase shift determinator determines said phase shift associated with each of said phase-shifters further according to additional transmission effects to be introduced to said re-transmitted signal,
wherein said additional transmission effects include one of de-focusing and multi-beam.

14. The system according to claim 2 further comprising a switch coupled between said receivers and said relative phase determinator for coupling said relative phase determinator with said receivers according to a switching scheme.

15. The system according to claim 14, wherein said switching scheme is determined such that said relative phase determinator performs N−1 independent measurements of the relative phase between the signals received at each of receivers,
wherein N represents the number of receivers, and
wherein said switching scheme includes one of coupling said receiver of said reference transceiver module with said relative phase determinator and sequentially coupling each one of the other receivers with said relative phase determinator and coupling each adjacent pair of said receivers.

16. The system according to claim 14, wherein said switch is further coupled between said relative phase determinator and said phase-shifters, said switch sequentially couples said relative phase determinator with each one of said phase-shifters.

17. The system according to claim 1, wherein said second transceiver sub-system includes:
a second communication transceiver including:
a second communication receiver receiving a communication signal from an antenna; and
a second communication signal determinator, coupled with said second communication receiver, determining communication signal parameters respective of said received communication signal;
a second RADAR and communication transceiver including and digital transceiver, said digital transceiver receiving a signal directly from said antenna, said digital transceiver sampling the received signal, said digital transceiver further determining second received signal parameters, said digital transceiver receiving from said second communication signal determinator said received communication signal parameters, said digital transceiver synthesizing a retransmitted signal according to said second received signal parameters and said received communication signal parameters;
an amplifier, coupled with said digital transceiver, amplifying signals received from said digital transceiver; and
a second transceiver sub-system antenna, coupled with said digital transceiver, with said second communication receiver and with said amplifier, said antenna transmitting signals providing by said amplifier and provides received signals to said digital transceiver and to said communication receiver.

18. The system according to claim 17, wherein said second received signal parameters and said received communication signal parameters are selected from the group consisting of:
frequency;
phase;
amplitude;
pulse rise time;
Pulse fall time; and
intra-pulse modulation scheme.

19. The system according to claim 17, wherein said plurality of antennas and said second transceiver sub-system antenna are blade antennas.

20. The system according to claim 1, wherein said a first retro-directional transceiver sub-system operates between the UHF band and the C frequency band, and
wherein said second transceiver sub-system operates between the VHF band and the UHF band.

* * * * *